United States Patent [19]
Molteni et al.

[11] 3,920,631
[45] Nov. 18, 1975

[54] VITAMIN $B_{12}$ DERIVATIVES HAVING PROLONGED ACTIVITY

[75] Inventors: Luigi Molteni, Milan; Eraldo Antonini, Rome; Emilio Oradi, Bergamo, all of Italy

[73] Assignee: Dr. L. Zambeletti S.p.A., Milan, Italy

[22] Filed: Mar. 25, 1974

[21] Appl. No.: 454,250

[30] Foreign Application Priority Data
Apr. 4, 1973   Italy .................................. 22596/73

[52] U.S. Cl. .......... 260/211.7; 424/180; 260/209 D
[51] Int. Cl.² ......................................... C07H 1/00
[58] Field of Search .......... 260/211.7, 211, 210 NE, 260/210 K, 210 AB; 424/180, 181, 182

[56] References Cited
UNITED STATES PATENTS
3,773,756   11/1973   Penasse et al. .................. 260/211.7

Primary Examiner—Johnnie R. Brown
Assistant Examiner—Cary B. Owens
Attorney, Agent, or Firm—Flynn & Frishauf

[57] ABSTRACT

A vitamin $B_{12}$ derivative of prolonged activity is produced by reacting dextran with cyanogen bromide and treating the product with cobamamide.

5 Claims, No Drawings

VITAMIN $B_{12}$ DERIVATIVES HAVING PROLONGED ACTIVITY

This invention relates to vitamin $B_{12}$ analog.

Some vitamin $B_{12}$ derivatives have already been prepared, such as hydroxycobalamine, methylcobalamine and cobamamide, the pharmacological properties of which do not differ substantially from those of cyanocobalamine. The analog has the pharmacological action of vitamin $B_{12}$ and is characterized by prolonged activity.

It has now been found that vitamin $B_{12}$ derivatives in which cobamamide is covalently linked to dextran via the amido group of the former and the hydroxyl groups of the latter demonstrate characteristics which enable them to be used advantageously in therapy as pharmaceutical substances of vitamin $B_{12}$ type action of long duration. The derivatives of the present invention are stable and show their pharmacological effect whether administered orally, intramuscularly, or intravenously. Their effect is particularly lasting and protracted, which is a characteristic of great value for vitamin $B_{12}$, since cyanocobalamine, hydroxycobalamine, methylcobalamine, and cobamamide all have effects of short duration.

Dextran is preferably linked to cobamamide by activation of the hydroxyls of the dextran with cyanogen bromide and the formation of a cyclic iminocarbonate by reaction of the product with the amido group of cobamamide.

The molecular weight of the dextran used and the relative quantities of the activated dextran and cobamamide reacted together control the formation of products differing in their molar proportions of dextran and cobamamide residues. All the products have a pharmacological action of vitamin $B_{12}$ type, but of different durations, though all are longer than that of cobamamide. The percentage of cobamamide in the product may lie within wide limits, for example between 0.1% and 95% by weight, and for preference between 1% and 70% by weight.

The synthesis may be represented by the following equation:

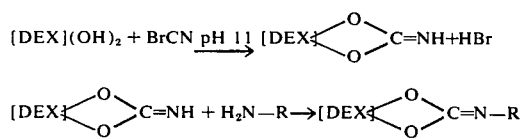

where $[DEX](OH)_2$ is dextran and $RNH_2$ is cobamamide.

The process may be operated by dissolving the dextran in water at alkaline pH and reacting it with the calculated quantity of cyanogen bromide, the alkaline pH being kept constant by adding sodium hydroxide solution. Unreacted cyanogen bromide is separated from the activated dextran by filtration through dextran gel and elution with a buffer at pH 9–10. A solution of cobamamide is then added to the solution of activated dextran so obtained and the mixture is allowed to stand at 0°–7°C., for 24–48 hours. The vitamin $B_{12}$ derivative can then be separated from unreacted dextran by chromatography, e.g. on Sephadex.

The vitamin titre of the compounds obtained has been determined by the method of C. Salvini Bolzoni (Boll. Ist. Sieroter, Milano, 1952, 31, 97) which consists of evaluating the growth halos of E. coli 113/3 on solid soil in a plate.

The following Examples illustrate the invention.

EXAMPLE 1

To 25 g. of "dextran 70" dissolved in about 800 ml. of water and brought to pH 11 by the addition of N sodium hydroxide 12.5 g. of cyanogen bromide are added in small portions, the pH being kept constant by the addition of N sodium hydroxide. The solution obtained is chromatographed on a column of Sephadex G-25 to separate the cyanogen bromide not bound to the dextran. 2% aqueous borax is used as eluant. The dextrorotatory fractions (2.5 l) are united and 1 g. of cobamamide is added. The mixture is cooled to about 5°C., and allowed to react for 24 hours. The solution obtained is chromatographed at pH 9 on a column of diameter 12.5 cm. and 120 cm. high containing about 3.5 kg. of Sephadex G-50, using as eluant 2% aqueous borax. In this way a red-violet solution is obtained, corresponding to a very distinct central band in the column.

This fraction of about 3500 ml. having a pH 9.2, is again chromatographed on a similar column this time using water as eluant, to remove the borax buffer. The first eluted red-violet fractions are of pH 7 and are a solution of pure dextran-cobamamide. By lyophilising it, about 15 g. of a pink powder are obtained. Thin layer chromatography on a sheet of Merck cellulose, using as eluant a solution of 251 mg. of ammonium chloride in 100 ml. of water, showed an Rf. = 0.89, while pure cobamamide under the same conditions has an Rf. = 0.53.

The microbiological titre of the product obtained shows that on a molar basis the cobamamide is present in the compound in the proportion of 1:2, i.e. 2 moles of dextran bind 1 mole of cobamamide. This figure is confirmed by the percentage titre of nitrogen.

The product contains:

| Theoretical % | Found % |
|---|---|
| N = 0.18 | 0.20 |
| H = 6.17 | 6.15 |
| C = 44.57 | 44.31 | corresponding to a cobamamide content of 1% of the final product.

This cobamamide derivative has been tested in male rats of the "Wistar" strain of weight 200 g. and fasting for 18 hours, by intravenous and intramuscular administration. The doses used intravenously were 0.5 mg/kg. of pure cobamamide and 50 mg/kg. of 1% dextran-cobamamide.

The blood levels were determined 15, 30, 60 and 120 minutes after administration by the aforementioned microbiological method, using as test microorganism Escherichia Coli 113/3 on a DIFCO base soil: Bacto-Agar added to glucose and Lederberg salts.

The results obtained are summarised in Table I from which it is seen that dextran-cobamamide administered intravenously produces serum levels of vitamin $B_{12}$ which are greater than those obtained with equivalent doses of pure cobamamide by 67% to 340% according to the time.

Following intramuscular administration, the serum levels obtained after administration of doses of 2 mg/kg. of pure cobamamide and 200 mg/kg. of dextran-cobamamide, determined at 60, 120, 180, 240 and 360 minutes after administration are summarised in Table II. From this it can be seen that the dextran-cobamamide shows an increase in serum levels from 7% to 356% over those obtained with pure cobamamide, according to the time.

EXAMPLE 2

25 g. of "dextran 70" dissolved in 800 ml. N sodium hydroxide solution (pH = 11) are activated by adding 12.5 g. of BrCN. After chromatography on Sephadex G-25 (to eliminate unreacted BrCN; using 2% borax solution as eluant) the dextrorotatory fractions are united and 3 g. of pure cobamamide are added.

The condensation reaction is completed by allowing the mixture to stand for 24 hours at 5°C. The resultant solution is chromatographed over Sephadex G-50, eluting with 2% borax solution; the red violet solution obtained is rechromatographed on Sephadex G-50 to eliminate borax. A central red-violet band separates in the chromatography column; this band is eluted at pH = 7 and the solution is brought to dryness by lyophilisation.

23 g. of a pink powder are obtained, the microbiological titre of which (as cobamamide) is 2%. This titre is confirmed by the amount of nitrogen, which is 0.35%. confirming the fact that the cobamamide is bound to the dextran in the molar proportion 1:1. A thin layer chromatograph check (on a cellulose sheet, using as eluant 251 mg. of ammonium chloride in 100 ml. of water) shows a single red mark of Rf. = 0.89, while cobamamide under the same conditions has Rf. = 0.53. The product decomposes by carbonisation at 255°C.

The dextran-cobamamide has been pharmacologically tested by intravenous, intramuscular and oral administration in the male "Wistar" rat of about 200 g. each, fasted for 19 hours.

The doses used were as follows: intravenously, 0.6 mg/kg. of cobamamide and 30 mg/kg. of dextran-cobamamide; intramuscularly, 2.5 mg/kg. of cobamamide and 125 mg/kg. of dextran-cobamamide; and orally, 25 mg/kg. of cobamamide and 1250 mg/kg. of dextran-cobamamide. The serum levels were determined by the method described in the previous Example. Samples for analysis were taken after the following times: for intravenous admininstration, 15, 30, 60, 120 and 240 minutes after administration; for intramuscular administration, 60, 120, 240 and 360 minutes after administration; for oral administration, 60, 120, 240 and 360 minutes after administration. The results are summarised in Tables III, IV and V respectively.

From these it is evident that the dextran-cobamamide, for the three paths of administration tested, significantly increases the levels of vitamin $B_{12}$ compared with the levels obtained after administration of equivalent doses of pure cobamamide; for intravenous administration the increase lies between 157% and 225%; for intramuscular administration the increase varies between 2.6% and 479%; and for oral administration the increase varies between 66% and 1300%.

EXAMPLE 3

500 mg. of "dextran 40" dissolved in $H_2O$ (about 25 ml.) are brought to pH 11 with N sodium hydroxide. To this solution 500 mg. of cyanogen bromide are added in small portions keeping the pH constant by adding N sodium hydroxide. The solution is chromatographed on a column of Sephadex G-50 to separate the cyanogen bromide not bound to the dextran. 2% borax is used as eluant. The dextrorotatory fractions are collected (about 60 ml. when united) and 500 mg. of cobamamide are added to them. The mixture is brougnt to about 5°C., in a refrigerated cell and allowed to react for 24 hours.

The solution removed from the refrigerated cell (about 60 ml.) of pH = 9 is chromatographed on a column of diameter 4 cm. and height 60 cm. containing about 500 g. of Sephadex G-50 using as eluant 2% borax solution. A red-violet solution is obtained by chromatography, from the central band of the column, which is distinct from the bright red head and tail bands.

To eliminate the borax buffer present, 20 g. of "coarse" Sephadex G-25 are introduced into the above solution. This method, on swelling, absorbs all the borax present and a good part of the solvent water. In this way the solution is concentrated to somewhat less than one half the volume of the original solution and the entire buffer is eliminated simultaneously. The resultant solution is lyophilised and about 300 mg. of pink powder are obtained. Thin layer chromatography of the product, on a sheet of Merck cellulose, using as eluant a solution of 251 mg. of ammonium chloride in 100 ml. of water, showed a single mark of Rf = 0.53.

The microbiological titre of this product has shown that the cobamamide is present in the final compound to the extent of 70%. The nitrogen titre confirmed the microbiological titre.

The serum levels of vitamin $B_{12}$ were determined in the rat after administration of the product obtained in an experiment analogous to those previously described, with withdrawals of serum 15, 30, and 60 minutes after intravenous administration. The result, as shown in Table VI, shows an increase in the level of vitamin $B_{12}$ over the level obtained with equivalent doses of cobamamide of between 231% and 112% (according to the time of withdrawal).

EXAMPLE 4

The solution obtained from reacting 0.5 gram of cobamamide with 0.5 gram of activated dextran (prepared as described in the previous Example) and leaving for 36 hours at 4°C., is chromatographed over a column of Sephadex G-50, using 2% borax solution as eluant. By chromatography a red-violet solution is obtained, which is placed in a dialysis cell provided with a filtrant membrane which retains all substances of molecular weight greater than 10,000. By this filtration the borax and the small quantities of unreacted cobamamide present in the solution are easily eliminated. The total volume of liquid is concentrated simultaneously to about ⅓ of the original value. By adding 5 volumes of acetone to the concentrated solution so obtained, a microcrystalline pink powder is precipitated after some hours of rest. The product obtained is absolutely identical to that obtained in Example 3 as shown by elementary analysis, the vitamin titre and the determination of the serum vitamin levels in the rat.

The invention includes within its scope pharmaceutical compositions comprising a vitamin $B_{12}$ derivative of the invention and a compatible pharmaceutically acceptable carrier. Such compositions may be made up in manner known per se using diluents and excipients known in the art.

In our Italian application No. 22595/73, filed April 4, 1973 and entitled "Method for Prolonging the Action of Pharmaceutical Substances", we have described and claimed a method of producing a derivative having prolonged activity of a pharmacologically or therapeutically active substance containing an amino or amido group which comprises reacting the said substance with a polysaccharide so as to form covalent linkages between the two via the amino or amido group of the former and the hydroxyl groups of the latter and derivatives so obtained.

TABLE I

Blood levels of Vitamin $B_{12}$ in the rat, after intravenous administration of cobamamide and dextrancobamamide

| Pharmaceutical substance | Dose: mg/kg | Vitamin $B_{12}$ : $\mu$/ml serum at | | | | |
|---|---|---|---|---|---|---|
| | | 15 | 30 | 60 | 120 | minutes |
| Cobamamide | 0.50 | 4.75 | 2.25 | 0.58 | 0.14 | |
| | | 4.13 | 2.20 | 0.95 | 0.14 | |
| | | 6.25 | 2.88 | 1.25 | 0.12 | |
| | | 4.50 | 2.00 | 1.15 | 0.11 | |
| | $\overline{M} \pm$ e.s. | 4.91 ± 0.47 | 2.33 ± 0.19 | 0.98 ± 0.15 | 0.13 ± 0.01 | |
| *Dextran + cobamamide | 50.00 | 8.50 | 5.00 | 2.25 | 0.49 | |
| | | 7.25 | 4.88 | 2.20 | 0.78 | |
| | | 7.00 | 3.88 | 3.13 | 0.41 | |
| | | 10.00 | 4.50 | 1.40 | 0.68 | |
| | $\overline{M} \pm$ e.s. | 8.19 ± 0.69 | 4.56 ± 0.25 | 2.24 ± 0.35 | 0.59 ± 0.07 | |

*Dextran + cobamamide: 99% + 1%

TABLE II

Blood levels of Vitamin $B_{12}$ in the rat, after intramuscular administration of cobamamide and dextran - cobamamide

| Pharmaceutical substance | Dose: mg/kg | Vitamin $B_{12}$ : $\mu$/ml serum at: | | | | |
|---|---|---|---|---|---|---|
| | | 60 | 120 | 180 | 240 | 360 minutes |
| Cobamamide | 2 | 10.50 | 3.25 | 0.82 | 0.04 | 0.00 |
| | | 10.60 | 3.90 | 0.93 | 0.08 | 0.00 |
| | | 9.50 | 3.80 | 0.70 | 0.06 | 0.00 |
| | | 9.00 | 3.60 | 0.80 | 0.06 | 0.00 |
| | $\overline{M} \pm$ e.s. | 9.90 ± 0.39 | 3.64 ± 0.14 | 0.81 ± 0.05 | 0.06 ± 0.09 | 0.00 ± 0.00 |
| *Dextran + cobamamide | 200 | 10.80 | 4.25 | 4.10 | 2.00 | 0.42 |
| | | 11.50 | 5.50 | 3.50 | 1.70 | 0.39 |
| | | 9.60 | 5.50 | 2.70 | 1.30 | 0.42 |
| | | 10.80 | 4.50 | 4.50 | 1.60 | 0.30 |
| | $\overline{M} \pm$ e.s. | 10.68 ± 0.39 | 4.94 ± 0.33 | 3.70 ± 0.39 | 1.65 ± 0.14 | 0.38 ± 0.03 |

*Dextran + cobamamide: 99% + 1%

TABLE III

Blood levels of Vitamin $B_{12}$ in the rat, after intravenous administration of cobamamide and dextran - cobamamide

| Pharmaceutical substance | Dose: mg/kg | Vitamin $B_{12}$ : $\mu$/ml serum at: | | | | |
|---|---|---|---|---|---|---|
| | | 15 | 30 | 60 | 120 | 240 minutes |
| Cobamamide | 0.6 | 1.55 | 1.98 | 0.63 | 0.08 | 0.00 |
| | | 0.80 | 1.43 | 0.75 | 0.07 | 0.00 |
| | | 1.30 | 0.98 | 0.50 | 0.06 | 0.00 |
| | | 1.07 | 1.25 | 0.55 | 0.06 | 0.00 |
| | | 1.55 | 1.55 | 0.70 | 0.17 | 0.00 |
| | | 1.90 | 1.60 | 0.70 | 0.17 | 0.00 |
| | | 2.45 | 1.60 | 0.75 | 0.17 | 0.00 |
| | | 1.70 | 1.50 | 0.70 | 0.17 | 0.00 |
| | $\overline{M} \pm$ e.s. | 1.54 ± 0.19 | 1.48 ± 0.10 | 0.66 ± 0.03 | 0.12 ± 0.2 | 0.00 |
| *Dextran + cobamamide | 30 | 3.50 | 2.65 | 1.85 | 0.48 | 0.23 |
| | | 3.75 | 2.85 | 1.55 | 0.50 | 0.09 |
| | | 6.00 | 2.50 | 1.55 | 0.38 | 0.14 |
| | | 2.63 | 2.45 | 1.40 | 0.45 | 0.06 |
| | | 3.75 | 2.63 | 1.55 | 0.30 | 0.09 |
| | | 3.75 | 3.50 | 1.18 | 0.33 | 0.09 |
| | | 4.50 | 2.88 | 1.70 | 0.29 | 0.07 |
| | | 2.88 | 3.25 | 1.25 | 0.43 | 0.10 |
| | $\overline{M} \pm$ e.s. | 3.84 ± 0.37 | 2.84 ± 0.13 | 1.50 ± 0.08 | 0.39 ± 0.03 | 0.11 ± 0.02 |

*Dextran + cobamamide: 98% + 2%

TABLE IV

Blood levels of Vitamin $B_{12}$ in the rat, after intramuscular administration of cobamamide and dextran-cobamamide

| Pharmaceutical substance | Dose: mg/kg | Vitamin $B_{12}$ : $\mu$/ml serum at: | | | | |
|---|---|---|---|---|---|---|
| | | 60 | 120 | 240 | 360 | minutes |
| Cobamamide | 2.5 | 9.50 | 2.40 | 0.30 | 0.02 | |
| | | 8.00 | 2.35 | 0.14 | 0.03 | |
| | | 11.50 | 2.63 | 0.26 | 0.03 | |
| | | 12.00 | 2.35 | 0.29 | 0.02 | |
| | | 8.25 | 1.55 | 0.17 | 0.02 | |
| | | 5.25 | 1.90 | 0.31 | 0.02 | |
| | | 5.25 | 1.55 | 0.21 | 0.02 | |
| | | 7.50 | 1.55 | 0.22 | 0.02 | |
| | $\overline{M} \pm$ e.s. | 8.41 ± 0.89 | 2.03 ± 0.16 | 0.24 ± 0.02 | 0.02 ± 0.00 | |
| | | 9.50 | 7.75 | 1.55 | 0.65 | |

TABLE IV-continued

Blood levels of Vitamin $B_{12}$ in the rat, after intramuscular administration of cobamamide and dextran-cobamamide

| Pharmaceutical substance | Dose: mg/kg | Vitamin $B_{12}$ : $\mu$/ml serum at: | | | | |
|---|---|---|---|---|---|---|
| | | 60 | 120 | 240 | 360 | minutes |
| *Dextran + cobamamide | 125 | 9.50 | 9.50 | 1.90 | 0.65 | |
| | | 9.50 | 7.75 | 1.25 | 0.68 | |
| | | 11.50 | 9.50 | 1.55 | 1.00 | |
| | | 8.00 | 4.75 | 1.50 | 0.33 | |
| | | 8.00 | 3.50 | 1.25 | 0.46 | |
| | | — | — | 1.10 | 0.68 | |
| | | 5.25 | 3.50 | — | — | |
| | | 7.75 | 6.50 | 1.00 | 0.35 | |
| | $\overline{M} \pm$ e.s. | 8.63 ± 0.65 | 6.59 ± 0.87 | 1.39 ± 0.10 | 0.60 ± 0.08 | |

*Dextran + cobamamide: 98% + 2%

TABLE V

Blood levels of Vitamin $B_{12}$ in the rat, after oral administration of cobamamide and dextran-cobamamide

| Pharmaceutical substance | Dose: mg/kg | Vitamin $B_{12}$ : $\mu$/ml serum at: | | | | |
|---|---|---|---|---|---|---|
| | | 60 | 120 | 240 | 360 | minutes |
| Cobamamide | 25 | 0.46 | 1.10 | 0.02 | 0.02 | |
| | | 0.49 | 1.00 | 0.04 | 0.03 | |
| | | 0.58 | 1.10 | 0.03 | 0.04 | |
| | | 0.46 | 1.53 | 0.05 | 0.04 | |
| | | 0.65 | 0.85 | 0.03 | 0.04 | |
| | | 0.39 | 0.70 | 0.03 | 0.03 | |
| | $\overline{M} \pm$ e.s. | 0.50 ± 0.04 | 1.05 ± 0.12 | 0.03 ± 0.01 | 0.03 ± 0.01 | |
| *Dextran + cobamamide | | 0.04 | 0.05 | 0.05 | 0.49 | |
| | | 0.04 | 0.05 | 0.05 | 0.73 | |
| | | 0.04 | 0.05 | 0.05 | 0.46 | |
| | | 0.04 | 0.05 | 0.06 | 0.73 | |
| | | 0.04 | 0.05 | 0.06 | 0.65 | |
| | | 0.03 | 0.04 | 0.06 | 1.10 | |
| | $\overline{M} \pm$ e.s. | 0.04 ± 0.01 | 0.05 ± 0.01 | 0.05 ± 0.01 | 0.69 ± 0.09 | |

*Dextran + cobamamide: 98% + 2%

TABLE VI

Blood levels of Vitamin $B_{12}$ in the rat, after intravenous administration of cobamamide and dextran-cobamamide

| Pharmaceutical substance | Dose: mg/kg | Vitamin $B_{12}$ : $\mu$/ml serum at: | | | |
|---|---|---|---|---|---|
| | | 15 | 30 | 60 | minutes |
| Cobamamide | 0.30 | 1.90 | 0.93 | 0.53 | |
| | | 2.25 | 1.30 | 0.58 | |
| | | 2.10 | 1.10 | 0.63 | |
| | | 2.10 | 1.25 | 0.55 | |
| | | 2.60 | 0.93 | 0.42 | |
| | | 1.75 | 1.40 | 0.49 | |
| | | 1.90 | 1.00 | 1.45 | |
| | | 2.40 | 1.15 | 0.75 | |
| | $\overline{M} \pm$ e.s. | 2.13 ± 0.10 | 1.17 ± 0.07 | 0.55 ± 0.04 | |
| Dextran + cobamamide | 9.50 | 7.50 | 1.75 | 0.93 | |
| | | 5.75 | 2.10 | 1.20 | |
| | | 9.00 | 1.90 | 1.00 | |
| | | 5.75 | 2.80 | 0.75 | |
| | | 2.15 | 1.40 | | |
| | | 6.25 | 2.90 | 1.20 | |
| | | 7.50 | 3.10 | 0.88 | |
| | | 5.25 | 3.30 | 1.50 | |
| | $\overline{M} \pm$ e.s. | 7.06 ± 0.56 | 2.50 ± 0.21 | 1.10 ± 0.10 | |

We claim:

1. An analog of vitamin $B_{12}$ in which cobamamide is covalently linked to dextran via the amido group of the former and the hydroxyl groups of the latter.

2. An analog of vitamin $B_{12}$ of claim 1 having the formula;

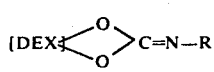

where [DEX] $(OH_2)$ is dextran and $RNH_2$ cobamamide.

3. An analog of vitamin $B_{12}$ of claim 2 containing 0.1 to 95% of cobamamide residues.

4. An analog of vitamin $B_{12}$ of claim 3 containing 1 to 70% by weight of cobamamide residues.

5. Process for producing an analog of vitamin $B_{12}$ of claim 1 which comprises reacting dextran with cyanogen bromide and reacting the resulting product with cobamamide.

UNITED STATES PATENT OFFICE
CERTIFICATE OF CORRECTION

PATENT NO. : 3,920,631
DATED : November 18, 1975
INVENTOR(S) : LUIGI MOLTENI et al It is certified that error appears in the above-identified patent and that said Letters Patent are hereby corrected as shown below:

Abstract, line 1: replace "derivative...activity"
    with --- analog ---.

Abstract, line 4: after the period, insert the following:
    ---The analog has the pharmacological action of vitamin $B_{12}$ and is characterized by prolonged activity.---.

Column 1, line 5: replace "analog" with --- derivatives having prolonged activity ---.

Column 1, lines 10-12: delete "The...activity".

Columns 7-8, TABLE VI:
    under "15 minutes", replace "2.15" with -- 9.50 --;
    under "30 minutes", replace "1.40" (second occurrence) with -- 2.15 --;
    under "60 minutes", insert "1.40" in the blank space; next to "Dextran + cobamamide", delete "9.50".

Column 8, Claim 2, lines 4-5: replace "$RNH_2$ cobamamide"
    with --- $RNH_2$ is cobamamide ---.

Signed and Sealed this eighteenth Day of May 1976

[SEAL]

Attest:

RUTH C. MASON
Attesting Officer

C. MARSHALL DANN
Commissioner of Patents and Trademarks